UNITED STATES PATENT OFFICE 2,394,327

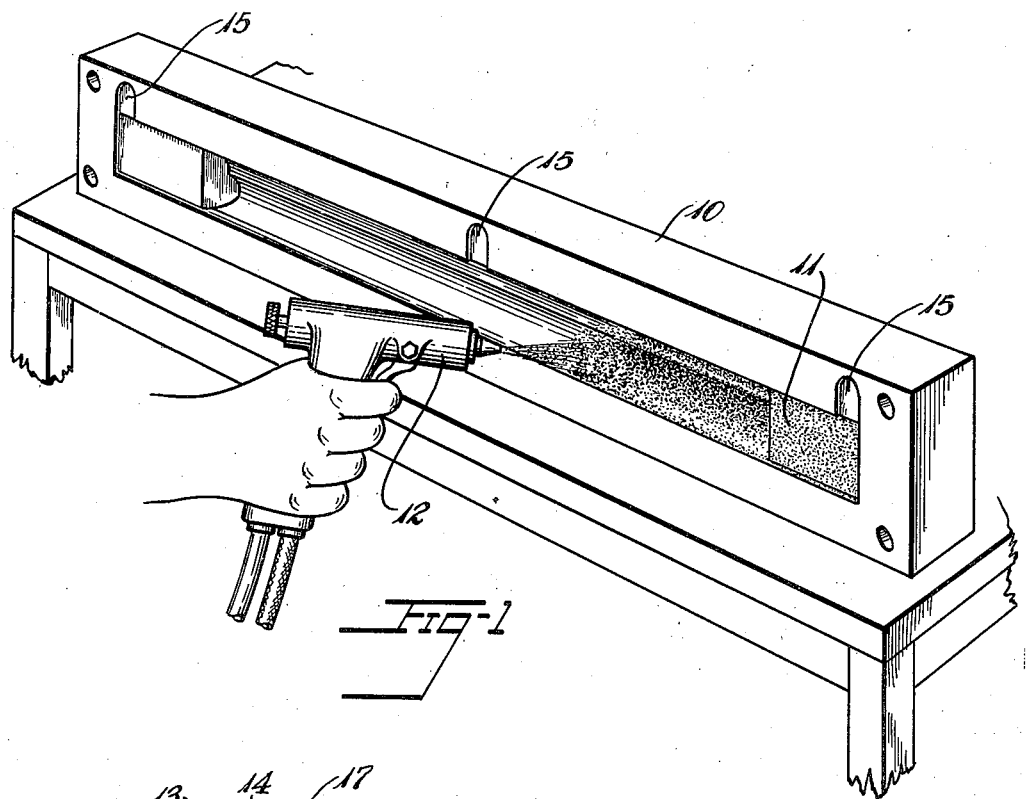
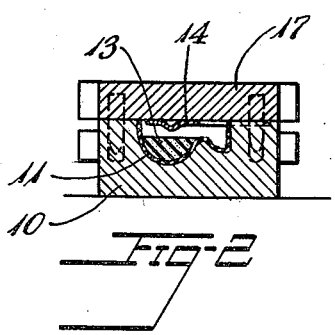
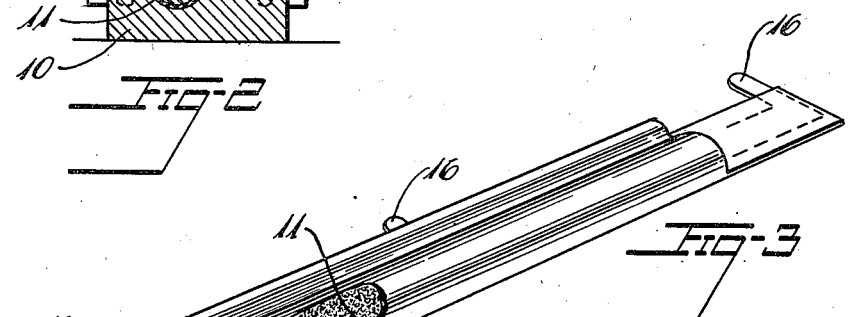
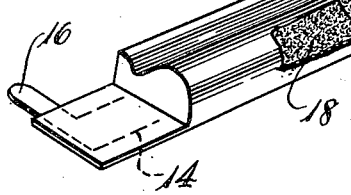
Inventors
Paul F. Niessen
Alvon R. Cox

METHOD OF MAKING CELLULAR RUBBER ARTICLES

Paul F. Niessen, Canal Fulton, and Alvon R. Cox, Cuyahoga Falls, Ohio, assignors to The B. F. Goodrich Company, New York, N. Y., a corporation of New York Application October 16, 1944, Serial No. 558,882

3 Claims. (Cl. 18—53)

This invention relates to the manufacture of a mold-vulcanized cellular article of rubbery material having a smooth, impervious protective skin coating of rubbery material, and especially to the manufacture of cellular rubber door-seal gaskets of the type used to seal doors of automobiles, electric refrigerators, and the like.

In the modern motor car of draft-free and rattle-proof construction it has been the custom to seal the doors with a strip of cellular rubber, or sponge rubber as it is often termed. It has been observed that in a relatively short time, while the car is still fairly new, the strips of sponge rubber often deteriorate, losing their resilience and flaking off. This has often necessitated expensive repairs or at least resulted in faulty sealing. It was found that sponge rubber was attacked by the combination of sun, rain, and oxygen of the air resulting in premature aging. In an effort to improve this condition it has been proposed to coat the sponge so that it would not be attacked simultaneously in many of its thin cell walls but rather the elements would first have to attack and destroy a substantial layer of impervious rubber.

It has been previously disclosed that sponge rubber articles could be coated with a layer of latex rubber by dipping the pre-blown sponge article in liquid latex and subsequently vulcanizing the dipped layer in air. However, whenever a coating is applied to a pre-blown sponge article difficulties are encountered in securing good adhesion of the latex layer to the surface of the pre-blown sponge body because in the blowing and vulcanizing step of sponge manufacture, a lubricated mold customarily is used. The lubricants generally used are finely-divided soapstone, talc and analogous materials. Use of these materials as lubricants results in a sponge article having on its outside surface a layer of such powdery lubricant embedded in the surface of the sponge. Therefore, in adhering latex or other coatings to a pre-blown sponge article, there is always present a layer of embedded lubricant between the sponge body and the adhering coating layer. As a result, adhesion to such an article is found to be very difficult if not impossible even when special adhesives and adhesion techniques are employed. Moreover, such adhesion as is obtained usually is not true adhesion or cohesion but only a mechanical locking-in of the latex to the outside pores of the sponge.

It was further found that not all sponge articles can be coated by dipping into latex for the reason that it is often necessary to leave certain areas of the sponge free of coating. In a dipping operation all of the surface immersed is coated and it is not ordinarily practical to prevent this.

It is accordingly the object of the present invention to provide simple, economical and efficient methods for producing coated cellular articles of rubbery material and particularly to provide for the rapid and inexpensive application of latex coatings more firmly adherent to the cellular body than has been possible heretofore. The invention also aims economically and efficiently to provide coated cellular products combining maximum resilience in the cellular body with maximum resistance of the coating to deleterious influences such as sunlight and oxygen of the air.

We have found that closely adherent and highly satisfactory coatings of latex rubber may be provided on cellular rubber articles by flash-drying the latex to form a hot film of latex rubber and then "blowing" the sponge composition into contact with the hot, tacky and as yet unvulcanized film of latex rubber. In a preferred embodiment this is accomplished by flash-drying on a preheated mold a coating layer of latex or other aqueous dispersion of a vulcanizable rubbery composition in such way that a layer of rubbery material is deposited on the mold surfaces, and then blowing a rubber composition into contact with that coating layer while it is still hot. The hot coating layer and the blown cellular body of rubbery material are vulcanized in mutual and intimate contact with the result that the bond between them is of a chemical nature rather than a mere mechanical locking in of the coating material to the outside pores of the sponge. The bond is of such strength that the cellular body itself will rupture before the bond is broken. To effect the desired results, all the steps in the process should preferably take place in close continuity.

It is highly desirable that the blowing and vulcanizing step take place while the coating layer is still hot from the flash-drying. In that condition the rubbery material is soft and relatively tacky whereas if the mold is allowed to stand and become cool, the coating "skins" over due to the action of the air and less satisfactory adhesion is secured. When the cellular portion is blown into contact with the soft tacky coating layer while freshly hot, an integral bond is formed which is stronger than the cohesive force of the sponge itself. For best results, the mold should not be permitted to cool below the neighborhood of the boiling point of water. Furthermore, the bond is not weakened by an intervening layer of lubricant as in the prior methods since no such layer is required in the present process.

It will also be appreciated that the invention eliminates completely the necessity of using special adhesives for bonding the latex coating to the cellular body, no such adhesive being used in the preferred embodiment of our invention. The use of adhesives is not absolutely prohibited, however, and in some few cases may be found desirable.

We have further found that a superior product results when the cellular body of the article is made from a composition having natural rubber as its base and the coating is deposited from a latex of neoprene or similar synthetic rubbery material having better resistance to light and other deleterious influences although lacking in a sponge product the resilience of a sponge made from natural rubber. A natural rubber sponge article coated with neoprene latex in the manner described combines to the maximum degree resilience in the cellular body and durability in the coating and accordingly is to be preferred.

When an aqueous dispersion of rubber is sprayed on a relatively hot mold only vapors of water and volatile preservatives are given off; these vapors can be drawn off and disposed of with no recovery operation required. The use of aqueous dispersions gives a coating process in which health and fire hazards are reduced to a minimum.

Rubber dispersed in any medium other than water produces dispersions of such high viscosity that dispersions containing more than 3-5% by weight of rubber are so high in viscosity that flow is all but impossible. Dispersions above 10-15% in rubber content, when the dispersion medium is other than water are of paste or dough-like consistency. Whereas aqueous dispersions of rubbery materials retain their water-like fluidity up to 30-40% total solids content. Concentrated dispersions of vulcanizable compositions suitable for coating are of substantially 60% total solids content. With such relatively concentrated coating material it is possible to build up a thick coating of rubbery material with relative ease. Such a coating is almost instantly dried upon striking the heated mold and is ready for subsequent steps in the process. Also latex rubbers do not soften rapidly as the temperature is raised and therefore do not suffer thermoplastic flow as do rubbery materials deposited from dispersing mediums other than water.

By masking localized areas of the mold, desired zones of the sponge may be left uncoated, a result ordinarily not feasible in the dip-coating methods of the prior art. The present process is therefore adaptable to the manufacture of a wider variety of articles.

The invention will now be described in greater detail with reference to the accompanying drawing of which, Fig. 1 is a perspective view showing the step of coating the preheated mold with an aqueous dispersion of a rubbery material in the manufacture of a coated cellular article of rubbery material such as an automobile door-sealing gasket, Fig. 2 is a sectional view showing the coated mold of Fig. 1 with a cellular rubber composition therein and the mold cover in place ready for the final heating operation, and Fig. 3 is a perspective view of an automobile door-seal gasket made in accordance with this invention, a section of the coating layer being broken away and sectioned for purposes of illustration.

In the practice of a preferred embodiment of the invention, a mold 10 of suitable size and configuration is preheated in any convenient manner to a temperature high enough to flash evaporate water. Temperatures from substantially the boiling point of water to substantially 300° F. may be used, the only upper limitation being that the rubber shall not be damaged by scorching. The preheated mold is sprayed or dusted with a coating (not shown) of a lubricant such as talc or soapstone, such lubricant serving to prevent adhesion of the finished product to the mold after vulcanization. With as little cooling as possible, the preheated and lubricated mold is then given a coating 11 of an aqueous dispersion of a rubbery material. The dispersions used for this purpose are preferably of the vulcanizable type of aqueous dispersion of a relatively high concentration. Since it is most advantageous to apply the coating as rapidly as possible, it was found that the use of more concentrated aqueous dispersions resulted in a faster and more satisfactory coating operation. Aqueous dispersions of most rubbery materials up to substantially 60% total solids content are fluid enough to be easily spread by any common means.

A preferred method of applying such coatings is by spraying, using a conventional spray gun 12 of the general type illustrated. When such coating is applied by spraying, aqueous dispersions of vulcanizable composition of substantially 50% total solids content may be used. The following composition is illustrative of a typical coating material:

| | Parts dry weight |
|---|---|
| Neoprene latex Type 571 | 100.0 |
| Zinc oxide | 25.0 |
| Natural whiting | 10.0 |
| Carbon black | 15.0 |
| Age-resistor | 3.0 |
| Casein | 0.5 |
| Aquarex D | 0.25 |
| Waterglass | 0.25 |

The coating 11 flash evaporates and dries almost instantly upon striking the preheated mold, making it possible to build up very rapidly, due to the use of such concentrated dispersions, a layer of any desired thickness. A mold of the type of Fig. 1 would preferably take a coating of approximately $\frac{1}{32}$ of an inch in thickness.

Following application of the coating 11 to the mold and preferably before any further cooling takes place, a strip 13 of unvulcanized and unblown rubbery composition containing a blowing agent and vulcanizing agents is inserted in the mold in contact with the hot coating layer 11. Any of the known blowing or sponge-producing rubbery compositions may be utilized as illustrated by the following:

| | Parts dry weight |
|---|---|
| Rubber, (natural, synthetic or reclaim) | 100 |
| Sulphur | 2.0 |
| Factice | 10.0 |
| Sodium bicarbonate | 10.0 |
| Whiting | 35.0 |
| Antioxidant | 1.0 |
| Accelerator | 0.5 |
| Carbon black | 35.0 |
| Fatty acid | 7.5 |
| Soft petrolatum | 15.0 |

A strip metal reinforcing member 14 then is positioned in the mold over the sponge composition 13, the mold being provided with recesses 15, 15 for receiving the projecting ears 16, 16 on the reinforcing strip. It is permissible, though not necessary, to pretreat the metal with a rubber-to-metal adhesive such as a thermoprene cement. Desirably, the cavities 15, 15 should be masked during the spray coating operation to leave the cavities and, later, the ears 16, 16 free of latex coating. Not all cellular articles require reinforcing but this is highly desirable in the particular embodiment illustrated.

The mold is then closed with the mold cover 17 and the assembly is placed in the usual platen press and subjected to molding heat and pressure. During such heating, the composition 13 "blows" and expands into intimate contact with the hot latex coating, as well as flowing about the metal strip 14, after which the blown composition and the coating become integrally vulcanized into a unitary structure surrounding and including the reinforcing metal strip.

After removing and opening the mold, the finished sealing gasket as shown in Fig. 3 is taken from the mold, the unblown composition 13 having now been blown to produce the cellular interior body 18 of the finished article. The latex coating 11 provides a substantially impervious, strongly adherent and generally more satisfactory coating upon the cellular body.

The gasket illustrated may be coated over all of its surface or may, as in the description above, by omitting the coating from the mold cover 17, be covered only on its outside sealing surface with the protective coating. In the gasket illustrated in Fig. 3, the protruding ears 16 of the reinforcing member 14 are left bare of coating so that the gasket may be clamped, spot-welded, or fastened in place by means of bolts or screws.

The aqueous dispersions of rubbery material used in the practice of this invention may be naturally occurring or artificially prepared aqueous dispersions of natural or synthetic rubbers or rubber-like materials, including but not being limited to, natural latex, artificial dispersions of natural, synthetic, or reclaimed rubber, latices of various synthetic rubbers and rubber-like materials such as the various polymers of butadiene either alone or as copolymers with styrene and acrylonitrile and the like as well as neoprene and the like.

While the invention has been described in considerable detail with references to the manufacture of certain cellular rubber door-seal gaskets, it will be understood that other articles of cellular rubbery composition may be made and that variations and modifications by the process herein described may be effected without departing from the spirit and scope of the invention as it is defined by the appended claims.

We claim:

1. A method of making a mold-vulcanized cellular article of rubbery material having an impervious protective skin coating of rubbery material; which method comprises preheating a mold to a temperature high enough to flash evaporate water; applying to the preheated mold an aqueous dispersion of a vulcanizable rubbery composition adapted, after drying and vulcanization, to produce an impervious protective skin coating of rubbery material, and flash-drying the dispersion on the mold; placing in the mold in contact with the dried coating layer, while it is still hot and before the coating has lost its tackiness from cooling and contact with the air, an unblown rubbery composition adapted, after heating, to produce a cellular body portion; and subjecting the assembly to molding temperature and pressure to blow the unblown rubbery composition and to vulcanize the coating layer and the blown cellular body portion in mutual contact so as to form an integral article; said operations being performed without permitting the mold to become cool.

2. A method of making a mold-vulcanized cellular article of rubbery material having an impervious protective skin coating of a rubbery material of substantially different composition than the cellular portion thereof; which method comprises preheating a mold to a temperature high enough to flash evaporate water; applying to the preheated mold an aqueous dispersion of a vulcanizable rubbery composition adapted, after drying and vulcanization, to produce an impervious protective skin coating of a light-resistant rubbery material, and flash drying the dispersion on the mold; placing in the mold in contact with the dried coating layer, while it is still hot and before the coating has lost its tackiness from cooling and contact with the air, an unblown rubbery composition adapted, after heating, to produce a cellular body portion of less light-resistant but more resilient rubbery material; and subjecting the assembly to molding temperature and pressure to blow the unblown rubbery composition and to vulcanize the coating layer and the blown cellular body portion in mutual contact so as to form an integral article; said operations being performed without permitting the mold to become cool.

3. A method of making a mold-vulcanized cellular article of rubbery material having a cellular body and an impervious protective skin coating thereon; which method comprises preheating a mold to a temperature high enough to flash-evaporate water; applying to the preheated mold an aqueous dispersion of a neoprene composition adapted, after drying and vulcanization, to produce an impervious protective skin coating of rubbery neoprene material, and flash-drying the dispersion on the mold; placing in the mold in contact with the dried coating layer, while it is still hot and before the coating has lost its tackiness from cooling and contact with the air, an unblown natural rubber composition adapted, after heating, to produce a cellular body portion; and subjecting the assembly to molding temperature and pressure to blow the unblown rubbery composition and to vulcanize the coating layer and the blown cellular body portion in mutual contact so as to form an integral article; said operations being performed without permitting the mold to become cool.

PAUL F. NIESSEN.
ALVON R. COX.